Figure 1:
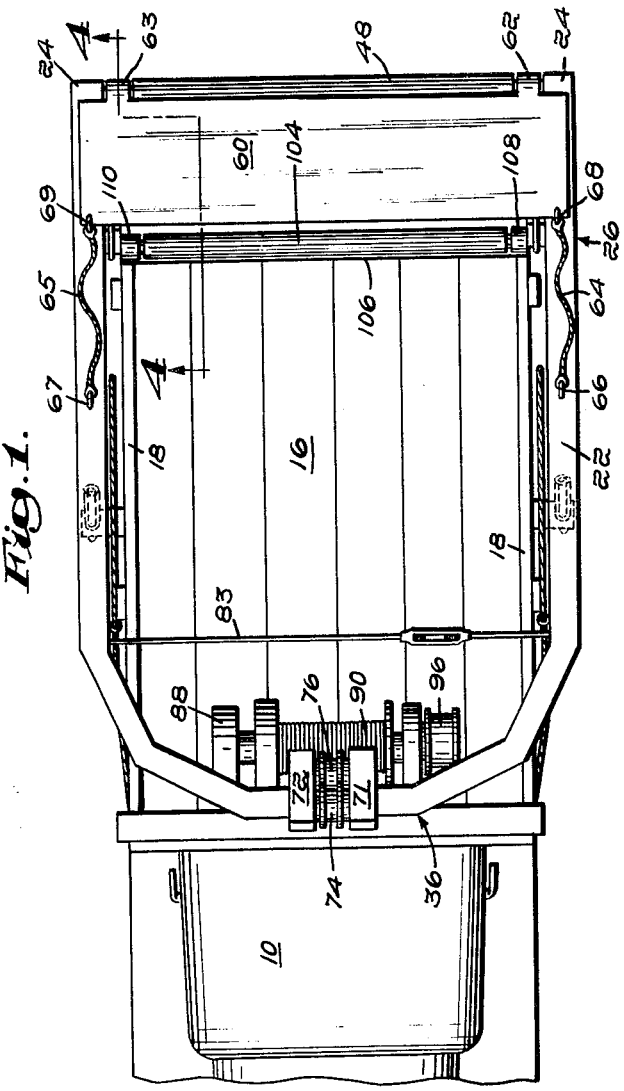

Jan. 26, 1965    B. A. BOOKER    3,167,200
PORTABLE CRANE

Filed June 26, 1961    4 Sheets-Sheet 1

Inventor:
Bernard A. Booker,
by Russell, Kittick + Pfund
Attorneys

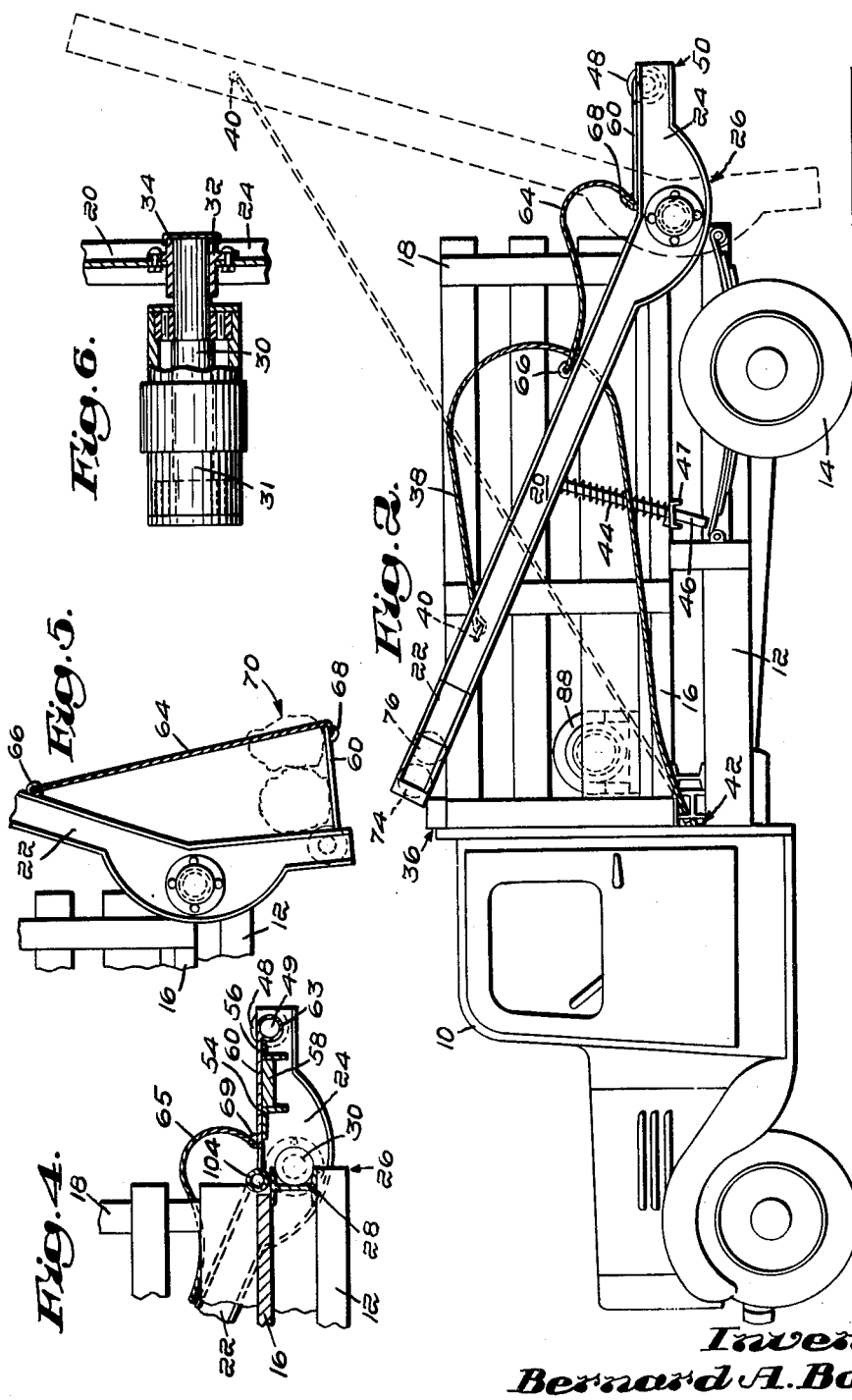

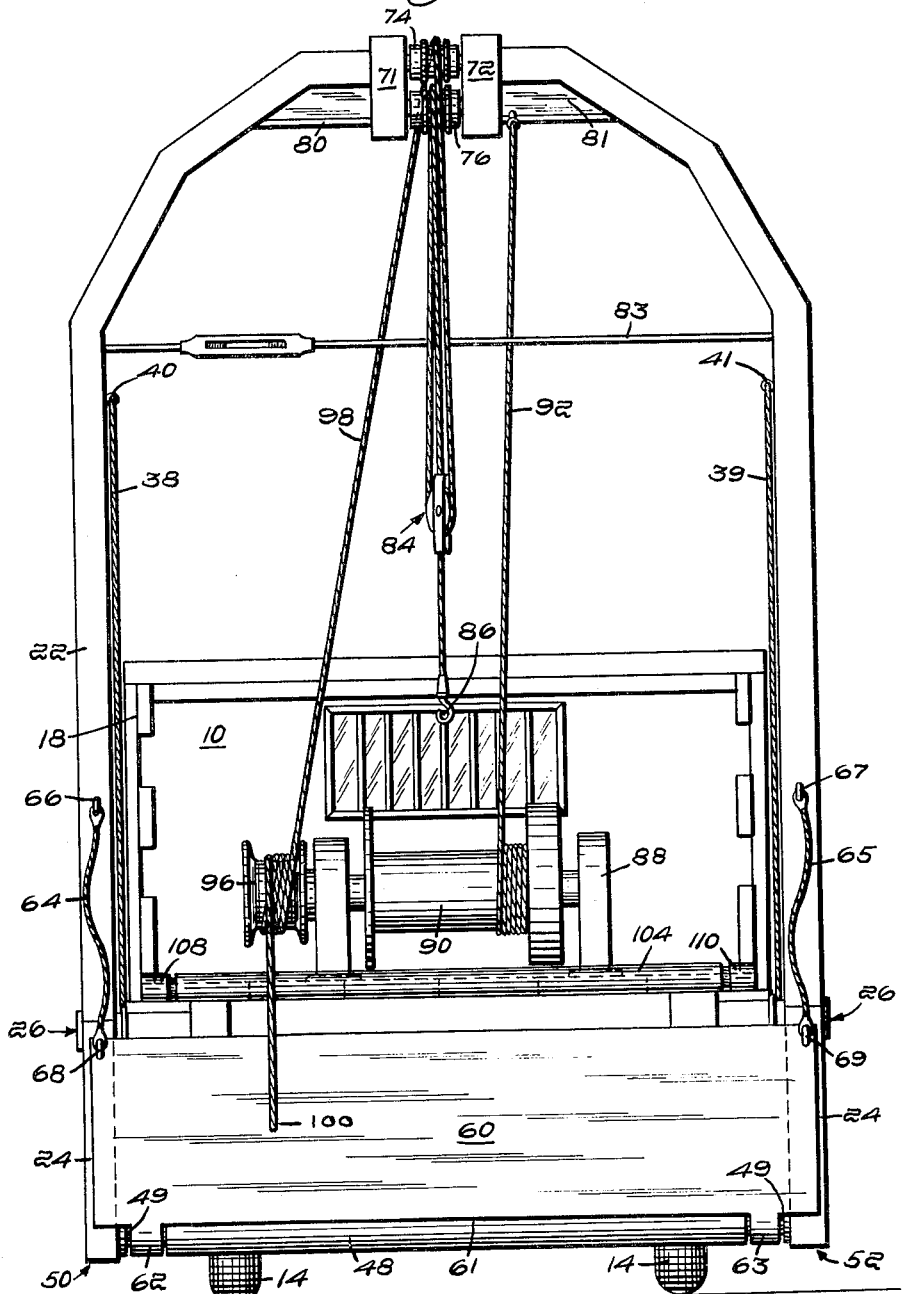

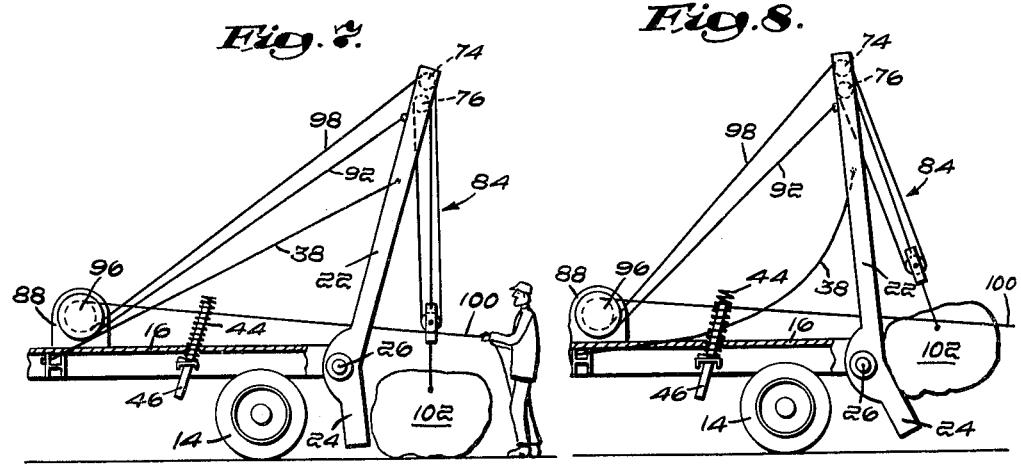
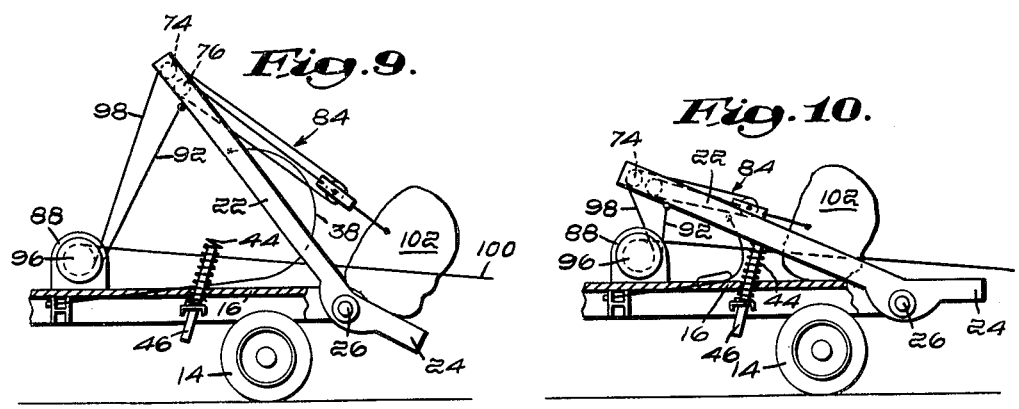
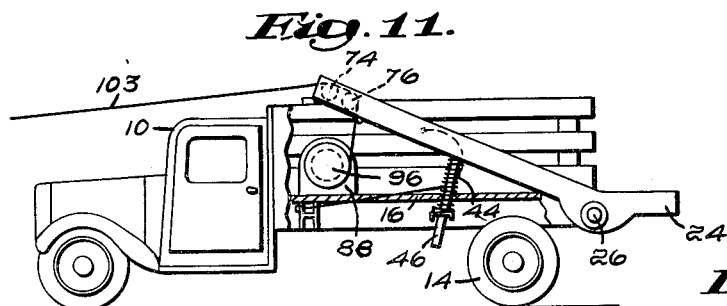

United States Patent Office 3,167,200
Patented Jan. 26, 1965

3,167,200
PORTABLE CRANE
Bernard A. Booker, Meader St., North Berwick, Maine
Filed June 26, 1961, Ser. No. 119,658
5 Claims. (Cl. 214—523)

This invention relates to improvements in cranes or hoists and more particularly to improvements in construction of vehicle mounted cranes to substantially increase the load lifting capacity of the crane in relation to gross vehicle weight.

Under the teachings of the prior art, it has been customary to provide vehicle mounted cranes of various types. Of these perhaps the most common are truck mounted cranes, as for example automobile wrecker units. In the usual construction, a crane substantially similar to those used in stationary applications is secured to the bed or rear section of the truck body.

This type of truck mounted crane serves well in some applications. There are, however, certain disadvantages to such construction which become limitations on the crane's usefulness under certain conditions. One such disadvantage relates to the lifting capacity of the crane. Where the crane extends rearwardly of the truck body, the maximum weight which may be raised without causing the front wheels of the truck to lift off the ground is an amount equal to the weight of the truck multiplied by the distance from the rear axle forward to the center of gravity of the truck and divided by the distance from the rear axle rearward to the load, the two distances being taken in the horizontal plane of the rear axle. In truck cranes constructed under the teachings of the prior art, the maximum load which may be lifted is generally in the area of one-quarter of the weight of the truck itself. In certain applications, it has, therefore, been necessary to use very heavy truck bodies to carry the cranes. These bodies are expensive compared to bodies which will transport the weight it is desired to lift.

A second disadvantage to prior art truck cranes is that they generally include booms or arms which extend well beyond the truck body and render parking of the truck in a normal garage impossible. They also generally render the truck useless for general hauling, since most of the bed area is used to mount the crane.

The objects of this invention are to provide a crane which may be mounted on a vehicle in such manner as to lift loads of a magnitude at least equal to the truck's weight and, at the same time, to provide a maximum of carrying space on the truck body and a minimum of increase in the height and width dimensions of the truck.

In the practice of the invention in a preferred embodiment thereof, I construct a truck crane suitable for use in loading tree trunks and large rocks onto the truck employed. I position a steel arch member or hoisting frame on the bed of a suitable truck by rotatably connecting the leg segments of the arch to the chassis at the rear extremity thereof, slightly rearward of the rear axle. The leg segments of the arch continue rearwardly from the point of connection and are bent somewhat at an angle to the arch portion thereof to form an extension of the truck bed when the arch is rotated as far as possible toward the front of the truck (at which point it rests on a portion of the truck body). As the arch is raised by rotating it rearwardly, the bed extension falls below the bed proper until in operating position it is nearly vertical. The arch carries suitable tackle whereby a load may be lifted. As the load rises, the arch may be moved forwardly ultimately depositing the load on the extension as it resumes its horizontal position.

These and other objects and the features of my invention will become more apparent as the description proceeds with the aid of the accompanying drawings, in which:

FIG. 1 is a fragmentary plan view of a truck mounted crane according to the invention;
FIG. 2 is a side view of the truck crane in lowered position indicating its raised position in dotted lines;
FIG. 3 is a rear view of the truck with the crane in raised position;
FIG. 4 is a section taken on the line 4—4 of FIG. 1;
FIG. 5 is a fragmentary side view of the crane showing the bed extension cover open;
FIG. 6 is a partially cut-away section of a mounting bearing;
FIGS. 7, 8, 9, and 10 are fragmentary side views of the truck crane illustrating its operation in lifting a load; and
FIG. 11 is a side view of the truck crane showing an alternative use of its winch.

Having particular reference to FIGS. 1, 2, and 3 I employ a conventional truck having a cab 10 and a frame 12 extending rearwardly thereof and provided with rear (driving) wheels 14 positioned slightly forward of the rearmost portion of the frame 12. A flat body member or bed 16 is mounted on the frame 12. In FIGS. 1, 2, and 3 slat sides 18 are shown on the bed 16 which are an optional feature and are not necessary to the invention.

Journaled to the bed 16, as hereinafter described, I provide a crane unit indicated generally at 20. The crane 20 is constructed of steel of I beam cross-section or other suitable material and comprises two basic portions, a hoisting frame or arch portion 22 and a bed extension portion 24. The arch portion 22 is generally U shaped and serves as a frame for holding suitable tackle as hereinafter described. The bed portion 24 in the lowered position of the crane extends rearwardly from the rear of the truck bed 16 and serves in part as an extension thereof. The crane 20 is formed as a unitary member having both arch portion 22 and bed extension portion 24 extending in opposite directions from the pivot point indicated generally at 26 of the crane 20. The arch portion 22 extends forwardly and upwardly (as seen in "down" position in FIG. 2) from the pivot point 26 while the bed extension portion 24 extends rearwardly in the horizontal plane of the bed 16.

The crane 20 is mounted to the frame 12 at the pivot point 26 as seen in FIGS. 4 and 6. The rear end of the frame 12 and bed 16 are prepared by positioning between them an I beam 28 extending from one side of the truck to the other. A rotatable axle or pivot member 30 is attached at each end of the beam 28 by welding its stationary housing 31 thereto and the axle 30 is positioned fast in a sleeve 32 formed in the crane 20 at either side thereof. The axles 30 and the associated sleeves 32 may be capped with suitable caps 34 if desired.

This mounting of the crane 20 permits its rotation with respect to the bed 16. When the crane 20 is in "down" position, the arch portion 22 extends forwardly along the truck. In the preferred embodiment, the arch portion 22 is longer than the bed 16 and, consequently, in "down" position is caused to rest on a portion of the cab structure, indicated at 36. In this position, the bed portion 24 acts as an extension of the bed 16 and provides support for additional load carrying space. The crane 20 in operating position is shown by dotted lines in FIG. 2 and is shown in end view in FIG. 3. It will be noted that in operating position, the arch portion 22 has been rotated rearwardly from "down" position to a point slightly beyond vertical. The angle between the arch portion 22 and the bed portion 24 is initially selected so that when the arch portion 22 has been rotated to operating position, the bed portion 24 has rotated downwardly until it is nearly vertical. It will be noted that the length of the bed portion 24 is limited by the height of the axles 30 from the ground.

In order to prevent the arch portion 22 from rotating too far beyond vertical, cables 38 and 39 of fixed length are provided which are secured to the arch portion 22 at 40 and 41 and to the frame 12 at 42 and 43. The length of cables 38 and 39 is selected to position the arch portion 22 such that the lines dropped from the top thereof as hereinafter described will fall as close as practical to the rear end of the truck. In order to cushion the lowering of the crane 20, a coiled spring 44 may be mounted around a suitable shaft 46 slidably positioned in a bracket 47 at either side of the bed 16 to engage the arch portion 22 and prevent it falling onto the truck so as to cause damage.

To facilitate loading of the truck, a roller 48 is journaled between the ends of the bed portion 24 at 50 and 52 as shown in FIG. 3. The roller 48 is provided with end segments 49 of reduced diameter for receiving a cover hereinafter described. Positioned from one side of the bed portion 24 to the other are two parallel angle irons 54 and 56 as shown in FIG. 4. Between these, a plank 58 is secured to provide flooring. A bed extension cover 60 is also provided. It is constructed of steel and dimensioned to provide the full area of the bed extension between the bed portions 24. The cover 60 is provided with sleeve elements 62 and 63 toward either side of its rear edge 61, the sleeve elements 62 and 63 being rotatably mounted on the reduced portions 49 of the roller 48. The cover 60 performs two functions. First, it provides a strong steel member for receiving loads placed upon it. Second, it may be rotated to a position substantially at right angles to the platform portion 24 as shown in FIG. 5. For this purpose, a pair of cables 64 and 65 are attached to the arch portion 22 at lugs 66 and 67 and to the cover 60 at lugs 68 and 69 to prevent the cover 60 from rotating more than 90°. When the crane 20 is in raised position, the cover 60 may be opened, as in FIG. 5, and ballast such as rocks indicated at 70 may be placed thereon to act as a counterweight for balancing the crane 20 when it has assumed the positions of FIGS. 8 and 9 and is being returned to the position of FIG. 2 when no load is present. In this way, a crash landing on the spring supported shaft is prevented.

At the uppermost portion of the arch 22, in the center thereof, opposed wall members 71 and 72 are rigidly secured, as shown in FIG. 3. Reinforcing I beams 80 and 81 may be added between the walls 71 and 72 and the sides of the arch 22. Between the walls 71 and 72, two pulleys 74 and 76 are journaled parallel to each other and lying in the plane of the arch 22. As seen in FIGS. 2 and 3, it may also be desirable when lifting very heavy loads to strengthen the upper portion of the arch 22 by a rigid stay as at 83.

The pulleys 74 and 76 serve the function of the upper block in a block and tackle system indicated at 84 which has a hook 86 or other suitable means for attaching a load.

In order to operate the block and tackle system 84, a conventional motorized winch 88 is mounted on the forward portion of the bed 16. The winch 88 is provided with a first head or drum 90 the operation of which is controlled by suitable manual clutch means (not shown). A cable 92 is wound on the drum 90 and has a free end which is attached to the arch 22 at its upper portion, as is shown in FIG. 3, where the cable 92 is attached at 94 to the reinforcing plate 81.

The winch 88 also has a second head or capstan 96 of conventional construction. The winch 88 is driven in such fashion that the head 90 and the capstan 96 may be operated independently. In operation, cable 98 from the block and tackle system 84 is passed several times around the capstan 96, and the free end 100 of cable 98 is then passed to the operator. It will thus be apparent that when the capstan 96 is caused to rotate continuously in the proper direction and a load is placed on the hook 86, the load may be lifted by the operator's drawing on the free end 100 of the cable 98 to cause its frictional engagement with the capstan 96.

In the preferred embodiment of the invention, a roller 104 is positioned across the rear end 106 of the bed 16 to facilitate the loading of objects onto the truck. The roller 104 is journaled for rotation in bearings 108 and 110 which are secured to the bed 16 and frame 12. The roller 104 must be horizontally set in slightly from the rear end 106 of the bed 16 to permit the bed portion 24 of the crane 20 to align itself with the bed 16 when the crane 20 is in "down" position.

The sequence of operation of the invention as shown in FIGS. 7 to 10 is as follows:

The arch 22 is placed in raised position as in FIG. 7. This simultaneously lowers the bed portion 24, but the cover 60 remains in closed position as in FIG. 3. The truck is backed up to a load 102 which is to be lifted. The block and tackle system 84 is attached to the load, and the free end 100 of cable 98 is taken by the operator who may stand rearward of the load. It is to be noted that the distance from the load to the rear axle of the truck is quite short due to the structure employed.

By drawing on the free end 100 of cable 98, it is caused to be engaged by the rotating capstan 96 and, consequently, the load 102 is lifted from the ground. When the load 102 has been raised sufficiently, that is when it is generally opposite the pivot 26, the arch 22 is swung slightly back toward the "down" position as seen in FIG. 8 so that the load rests against the cover 60 of the bed portion 24. In this position, some of the weight of the load 102 is taken off the block and tackle system 84.

By winding more of cable 92 on the drum 90, the arch 22 may be drawn further toward "down" position as seen in FIG. 9. Simultaneously, the bed portion 24 and cover 60 on which load 102 is resting is raised. Further winding of cable 92 causes the arch 22 to come to rest on the coiled springs 44 and shafts 46 whereupon the bed portion 24 and cover 60 is again aligned with the bed 16. The load 102 may then be drawn onto the bed 16, if desired, by taking in further on cable 98 which operates the block and tackle 84, as seen in FIG. 10.

FIG. 11 shows the manner in which the truck may be pulled out of mud or the like should it become struck by securing a cable 103 to some fast object (not shown) and passing it over the cab 10 and the pulleys 74 and 76 on the arch 22 and engaging it on the winch 88.

It is my intention to claim all changes and modifications of the example of the invention herein chosen for purposes of disclosure which do not constitute departures from the spirit and scope of the invention.

I claim:

1. A wheeled vehicle comprising a horizontal bed, a hoisting frame having two substantially parallel legs each pivoted at the sides of said vehicle rearward of the rear wheels thereof respectively and at the rear end of said bed, a cross member connecting said legs remote from the pivot axis of said legs, said hoisting frame being swingable from a forward down position to a rearward up hoisting position, an extension on each said leg integral therewith and commencing at the pivot axis and of less length than the distance from said pivot axis to the ground, a platform substantially in the plane of said extensions and extending therebetween, said extensions and platform movable from a horizontal position in alignment with said bed when said frame is in forward down position to a substantially vertical position downward from said pivot axis when said frame is in said up hoisting position, means for controlling the position of said frame, a pulley on said cross member, and means on said wheeled vehicle for applying a pulling force to a cable over said pulley to apply a lifting force to an object to the rear of said wheeled vehicle when said frame is in rearward up hoisting position and for thereafter rotating said frame forwardly while said lifted object is in suspended condition adjacent said platform, whereby as said platform is moved toward horizontal position the weight of said object will be progressively transferred from said cable to said platform and after said platform is horizontal said object may be moved forward by said cable to said bed to a position between said legs.

2. A wheeled vehicle comprising a horizontal bed, a hoisting frame having two substantially parallel legs, means for pivotally mounting said legs at the sides of said vehicle rearward of the rear wheels thereof and at the rear end of said bed, a cross member connecting said legs at a distance from the said pivot axis in the order of the length of said bed, means for controlling the movement of said frame about said pivots, an extension on each said leg of said frame integral therewith and commencing at said pivot axis and of less length than the distance from said pivot axis to the ground, a platform extending between and carried by said extensions and movable from a horizontal position in alignment with said bed when said frame is in forward down position to a substantially vertical position downward from said pivot axis when said frame is in up operating position, pulley means on said cross member, and means on said wheeled vehicle for applying a pulling force to a cable over said pulley means to apply a lifting force to an object to the rear of said wheeled vehicle when said frame is in up operating position and thereafter operating said frame controlling means to pivot said frame forwardly and downwardly while said lifted object is in suspended condition adjacent said then vertical platform, whereby as said frame controlling means commences to swing said frame forwardly said platform will engage and progressively receive the weight of said object and after said platform has reached horizontal position in alignment with said bed said object may be moved by said cable horizontally from said platform to said bed to a position between said legs.

3. A crane for installation on a truck having a horizontal bed comprising a hoisting frame having two parallel legs, a pair of pivot members mounted on said truck at the rear extremity thereof for rotatably engaging said legs at opposite sides of said truck respectively at the rear of said bed, extensions on each said leg integral therewith to assume a horizontal position aligned with the said bed of said truck extending rearwardly of said pivot members when said frame is rotated to a forward down position and to assume a substantially vertical position downward from said pivot members when said frame is rotated to an up operating position, means joining said extensions of said legs to provide a solid supporting platform, a cross member connecting said legs of said frame remote from said pivot members, a pulley member including two rollers mounted on said cross member to dispose a cable from said frame in position to receive a load when said frame is in up operating position, means on said truck for controlling the rotation of said frame and means on said truck for applying a force to a cable passing over said pulley member to lift a load positioned rearwardly of said truck whereupon said frame may be rotated toward forward down position thereby progressively depositing said load on said solid supporting platform, said cable then acting as means to move said load from said platform to said bed to a position between said legs.

4. A crane as defined in claim 3 further characterized by said means joining said extension members comprising a cover of sheet material dimensioned to extend therebetween from the rear extremity thereof substantially to the said pivot members, a roller positioned between said extensions at the extreme rearward ends thereof, means pivoting said cover at its rear edge in relation to said extensions whereby said cover may be rotated away from said extensions, and means for limiting the rotation of said cover to approximately 90°.

5. A load carrying truck comprising a horizontal bed and vertical sides, a hoisting frame having two parallel legs, pivot means at the rear of said bed for rotatably mounting said legs on said truck to make said frame swingable from a forward down position straddling said sides to a rearward up hoisting position, a pair of spaced supports and platform carried thereby extending from said pivot means in a direction substantially opposed to said legs, said legs and supports rotatable from a horizontal position in which said platform is aligned with said truck bed to a substantially vertical position below said pivot means, said platform being pivotally connected at its rear edge to said spaced supports, whereby it may be swung to horizontal position when said frame is in up hoisting position, and means for limiting movement of said platform.

References Cited in the file of this patent
UNITED STATES PATENTS

| | | |
|---|---|---|
| 2,190,258 | Colorigh | Feb. 13, 1940 |
| 2,411,821 | Choat | Nov. 26, 1946 |
| 2,433,598 | Chadwick | Dec. 30, 1947 |
| 2,571,361 | Harmanson | Oct. 16, 1951 |
| 2,649,981 | Tessier et al. | Aug. 25, 1953 |
| 2,747,754 | Maynard | May 29, 1956 |